United States Patent
Jones et al.

(10) Patent No.: US 10,735,254 B2
(45) Date of Patent: Aug. 4, 2020

(54) SYSTEM AND METHOD TO IDENTIFY DEVICES EMPLOYING POINT-TO-POINT-OVER ETHERNET ENCAPSULATION

(71) Applicant: AT&T Intellectual Property I, L.P., Atlanta, GA (US)

(72) Inventors: Kenneth Roger Jones, Cool, CA (US); Brian Gonszalves, Antioch, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 824 days.

(21) Appl. No.: 13/847,684

(22) Filed: Mar. 20, 2013

(65) Prior Publication Data

US 2013/0215790 A1     Aug. 22, 2013

Related U.S. Application Data

(63) Continuation of application No. 12/906,666, filed on Oct. 18, 2010, now Pat. No. 8,429,252, which is a continuation of application No. 11/590,447, filed on Oct. 31, 2006, now Pat. No. 7,840,659, which is a continuation of application No. 10/634,116, filed on Aug. 4, 2003, now Pat. No. 7,165,111.

(51) Int. Cl.
| | | |
|---|---|---|
| H04L 12/24 | (2006.01) | |
| G06F 15/16 | (2006.01) | |
| H04L 29/06 | (2006.01) | |
| H04M 11/06 | (2006.01) | |
| H04L 12/28 | (2006.01) | |
| H04L 29/08 | (2006.01) | |

(52) U.S. Cl.
CPC ...... *H04L 41/0803* (2013.01); *H04L 12/2859* (2013.01); *H04L 29/06* (2013.01); *H04L 67/14* (2013.01); *H04M 11/062* (2013.01); *H04L 69/329* (2013.01)

(58) Field of Classification Search
None
See application file for complete search history.

(56) References Cited

U.S. PATENT DOCUMENTS

| | | |
|---|---|---|
| 6,327,511 B1 | 12/2001 | Naismith et al. |
| 6,404,861 B1 | 6/2002 | Cohen et al. |

(Continued)

FOREIGN PATENT DOCUMENTS

| | | |
|---|---|---|
| JP | 11122277 A | 4/1999 |
| JP | 2003189378 A | 7/2003 |

(Continued)

OTHER PUBLICATIONS

Mamakos, L. et al., "RFC 2516: A Method for Transmitting PPP Over Ethernet (PPPoE)," <http://www.ietf.org/rfc/rfc2516.txt?number=2516>, Feb. 1999, 16 pages.

(Continued)

*Primary Examiner* — Duc T Duong
(74) *Attorney, Agent, or Firm* — Guntin & Gust, PLC; Eduardo Guntin

(57) ABSTRACT

A method may include generating, at a host device, a point-to-point over Ethernet active discovery packet. The point-to-point over Ethernet active discovery packet includes a tag that identifies a host device type of the host device.

15 Claims, 7 Drawing Sheets

(56) References Cited

U.S. PATENT DOCUMENTS

| | | | |
|---|---|---|---|
| 6,463,528 B1 | 10/2002 | Rajakarunanayake et al. | |
| 6,493,327 B1* | 12/2002 | Fingerhut | H04W 8/265 370/328 |
| 6,496,859 B2 | 12/2002 | Roy et al. | |
| 6,526,582 B1 | 2/2003 | Brodigan et al. | |
| 6,535,551 B1* | 3/2003 | Sweitzer et al. | 375/225 |
| 6,636,505 B1 | 10/2003 | Wang et al. | |
| 6,982,967 B1* | 1/2006 | Leung | H04L 29/12349 370/252 |
| 7,043,664 B1 | 5/2006 | Chiloyan | |
| 7,099,944 B1 | 8/2006 | Anschutz et al. | |
| 7,165,111 B2 | 1/2007 | Jones et al. | |
| 7,228,358 B1* | 6/2007 | McManus | H04L 12/5691 709/223 |
| 7,269,182 B1* | 9/2007 | Carrel | H04L 12/1836 370/390 |
| 7,733,904 B1* | 6/2010 | Borella et al. | 370/467 |
| 7,840,659 B2 | 11/2010 | Jones et al. | |
| 8,347,075 B1* | 1/2013 | Zhang | H04L 63/1441 380/256 |
| 2001/0030977 A1* | 10/2001 | May | H04L 12/2856 370/475 |
| 2002/0019875 A1* | 2/2002 | Garrett | H04L 12/2801 709/230 |
| 2002/0026504 A1 | 2/2002 | Lo | |
| 2002/0062361 A1* | 5/2002 | Kivipuro | G06F 21/10 709/219 |
| 2002/0093525 A1* | 7/2002 | Asauchi | H04L 41/18 715/714 |
| 2002/0095299 A1 | 7/2002 | Iwakata | |
| 2002/0133578 A1* | 9/2002 | Wu | H04L 63/1408 709/222 |
| 2002/0156947 A1 | 10/2002 | Nishio | |
| 2002/0165972 A1 | 11/2002 | Chien et al. | |
| 2003/0041151 A1* | 2/2003 | Senapati et al. | 709/229 |
| 2003/0053443 A1 | 3/2003 | Owens | |
| 2003/0053486 A1* | 3/2003 | Okamori | 370/474 |
| 2003/0055959 A1 | 3/2003 | Sato | |
| 2003/0060285 A1* | 3/2003 | Itakura | H04L 67/38 463/42 |
| 2003/0078999 A1* | 4/2003 | Lund | H04L 12/2856 709/220 |
| 2003/0097552 A1 | 5/2003 | Lewis et al. | |
| 2003/0101243 A1 | 5/2003 | Donahue et al. | |
| 2003/0103615 A1 | 6/2003 | Baltes | |
| 2003/0131107 A1 | 7/2003 | Godse et al. | |
| 2003/0131133 A1* | 7/2003 | Nyu et al. | 709/245 |
| 2003/0167405 A1 | 9/2003 | Freund et al. | |
| 2003/0169444 A1 | 9/2003 | Kemp et al. | |
| 2003/0172136 A1* | 9/2003 | Katagawa | G06F 9/547 709/220 |
| 2003/0182414 A1 | 9/2003 | O'Neill | |
| 2003/0182434 A1 | 9/2003 | Ogushi et al. | |
| 2003/0204640 A1* | 10/2003 | Sahinoja | H04L 41/046 719/311 |
| 2003/0233461 A1 | 12/2003 | Mariblanca-Nieves et al. | |
| 2004/0049572 A1* | 3/2004 | Yamamoto | G06F 16/10 709/224 |
| 2004/0052263 A1* | 3/2004 | Xu | H04L 12/2856 370/399 |
| 2004/0071133 A1* | 4/2004 | Yusko et al. | 370/356 |
| 2004/0093342 A1 | 5/2004 | Arbo et al. | |
| 2004/0105444 A1 | 6/2004 | Korotin et al. | |
| 2004/0117834 A1 | 6/2004 | Karaoguz et al. | |
| 2004/0128201 A1 | 7/2004 | Ofir et al. | |
| 2004/0181707 A1 | 9/2004 | Fujibayashi | |
| 2004/0216123 A1 | 10/2004 | Seebaldt | |
| 2004/0258028 A1* | 12/2004 | Hossain et al. | 370/335 |
| 2004/0258143 A1* | 12/2004 | Jones et al. | 375/222 |
| 2005/0021766 A1 | 1/2005 | McKeowen et al. | |
| 2005/0129002 A1 | 6/2005 | Koo | |
| 2006/0050862 A1* | 3/2006 | Shen | H04L 12/2856 379/219 |
| 2006/0161643 A1 | 7/2006 | Senapati et al. | |
| 2011/0035633 A1 | 2/2011 | Jones et al. | |
| 2016/0255342 A1* | 9/2016 | Blair | H04N 7/173 |

FOREIGN PATENT DOCUMENTS

| | | |
|---|---|---|
| JP | 2003204345 A | 7/2003 |
| WO | 0178310 A2 | 10/2001 |
| WO | 02077808 A2 | 10/2002 |

OTHER PUBLICATIONS

Mitchell, Bradley, "The MAC Address: An Introduction to MAC Addressing," <http://compnetworking.about.com/od/networkprotocolsip/1/aa062202a.htm> retrieved Jul. 20, 2007, 1 page.

"Ethernet address: Information from Answers.com," <http://www.answers.com/Ethernet+address?cat=technology> retrieved Jul. 20, 2007, 1 page.

"Sample List of Vendor/Ethernet MAC Address" <http://standards.ieee.org/regauth/oui/oui.txt> 7 pages.

"Vendor/Ethernet MAC Address Lookup and Search" <http://coffer.com/mac_find/> retrieved Jul. 21, 2007, 1 page.

International Search Report and Written Opinion of The International Searching Authority for International Application No. PCT/US04/33725, dated Aug. 29, 2005, 9 pages.

Non-Final Office Action for U.S. Appl. No. 10/700,337 received from the United States Patent and Trademark Office (USPTO) dated Jul. 5, 2005, 13 pages.

Non-Final Office Action for U.S. Appl. No. 10/700,337 received from the United States Patent and Trademark Office (USPTO) dated Oct. 4, 2005, 11 pages.

Notice of Allowance and Fee(s) Due for U.S. Appl. No. 10/700,337 received from the United States Patent and Trademark Office (USPTO) dated Mar. 21, 2006, 17 pages.

Non-Final Office Action for U.S. Appl. No. 11/452,175 received from the United States Patent and Trademark Office (USPTO) dated Mar. 29, 2007, 27 pages.

Final Office Action for U.S. Appl. No. 11/452,175 received from the United States Patent and Trademark Office (USPTO) dated Jul. 30, 2007, 30 pages.

Non-Final Office Action for U.S. Appl. No. 11/452,175 received from the United States Patent and Trademark Office (USPTO) dated Nov. 13, 2007, 17 pages.

Final Office Action for U.S. Appl. No. 11/452,175 received from the United States Patent and Trademark Office (USPTO) dated Dec. 10, 2008, 16 pages.

Non-Final Office Action for U.S. Appl. No. 11/452,175 received from the United States Patent and Trademark Office (USPTO) dated Jun. 1, 2009, 17 pages.

Notice of Allowance and Fee(s) Due for U.S. Appl. No. 11/452,175 received from the United States Patent and Trademark Office (USPTO) dated Nov. 17, 2009, 23 pages.

Non-Final Office Action for U.S. Appl. No. 12/636,325 received from the United States Patent and Trademark Office (USPTO) dated Oct. 1, 2010, 24 pages.

Final Office Action for U.S. Appl. No. 12/636,325 received from the United States Patent and Trademark Office (USPTO) dated Mar. 31, 2011, 24 pages.

Non-Final Office Action for U.S. Appl. No. 12/636,325 received from the United States Patent and Trademark Office (USPTO) dated Jul. 14, 2011, 16 pages.

Notice of Allowance and Fee(s) Due for U.S. Appl. No. 12/636,325 received from the United States Patent and Trademark Office (USPTO) dated Oct. 28, 2011, 20 pages.

Notice of Grounds for Rejection for Japanese Patent Application No. 2006-522554, dated Sep. 29, 2009, 3 pages.

International Search Report and Written Opinion of the International Searching Authority for International Application No. PCT/US04/19922, dated Mar. 10, 2005, 13 pages.

(56) References Cited

OTHER PUBLICATIONS

Supplemental European Search Report from the European Patent Office for corresponding EP Application No. 04755828.3-2416/1652099, PCT/US2004019222, dated Aug. 28, 2008, 3 pages.
Communication pursuant to Article 94(3) EPC for EP Application No. 04755828.3-2416, dated Nov. 14, 2008, 6 pages.
Communication pursuant to Article 94(3) EPC for EP Application No. 04755828.3-2416, dated Mar. 10, 2009, 3 pages.
International Preliminary Report on Patentability for International Application No. PCT/US2004/033725, dated May 8, 2006, 6 pages.

* cited by examiner

Host-Uniq TAG embedded Device
Identifier Code

Standard binary number system numbers → | 256 | 128 | 64 | 32 | 16 | 8 | 4 | 2 | 1 |

Example 1 → Device 1 = 0 0 0 0 0 0 0 0 1 = Efficient Networks 5861 Router

Example 2 → Device 512 = 1 1 1 1 1 1 1 1 1 = Netopia 3546 Router

FIG. 8

SYSTEM AND METHOD TO IDENTIFY DEVICES EMPLOYING POINT-TO-POINT-OVER ETHERNET ENCAPSULATION

CLAIM OF PRIORITY

The present application claims priority to and is a continuation of patent application Ser. No. 12/906,666 filed on Oct. 18, 2010, and entitled "System and Method to Identify Devices Employing Point-to-Point-Over Ethernet Encapsulation," which is a continuation of patent application Ser. No. 11/590,447 filed on Oct. 31, 2006 (now U.S. Pat. No. 7,840,659), and entitled "System and Method to Identify Devices Employing Point-to-Point-Over Ethernet Encapsulation," which is a continuation of patent application Ser. No. 10/634,116 filed on Aug. 4, 2003 (now U.S. Pat. No. 7,165,111), and entitled "System and Method to Identify Devices Employing Point-to-Point-Over Ethernet Encapsulation," each of which is expressly incorporated herein by reference in their entirety.

FIELD OF THE DISCLOSURE

The present disclosure relates generally to point-to-point-over Ethernet device identification.

BACKGROUND

Broadband service providers for distributed computing network services such as digital subscriber line (DSL) service typically require the end user, e.g., the home or business DSL subscriber, to employ a router, switch, or other customer premises equipment (CPE) to terminate the DSL connection at the residence or business location. The router or other CPE serves to terminate the Asynchronous Transfer Mode (ATM) connection, and generally utilizes point-to-point-over-Ethernet (PPPoE) enabled software to complete the user authentication process.

When a DSL subscriber encounters a problem with their DSL connection, the DSL service provider has no way to automatically determine the specific make and/or model of a particular CPE device being utilized by the DSL subscriber. In this situation, telephone inquiries to the subscriber are made to attempt to discover what type of equipment is being utilized at the CPE location, or a service technician is dispatched to "eyeball" the equipment when the customer does not know what type of CPE device is at their location. Consider a typical case of tens of thousands (or even millions, in some cases) of DSL subscribers and their respective CPE devices, and the support problems presented to the DSL service provider become evident.

In addition, when a service provider wishes to upgrade DSL transport services in their service area(s), e.g., the provision of Point to Point Protocol Termination and Aggregation (PTA), it may be difficult to cost-effectively deploy the new service plan if the service provider does not know what types of CPE devices are currently deployed. For example, if a new transport service is scheduled for deployment in a specific geographic region, but it is determined that a large number of CPE devices may not support the new service, delays in deployment result. Such delays lead to increased provider costs, which are typically passed along to the subscribers, resulting in higher rates.

BRIEF DESCRIPTION OF THE DRAWINGS

FIG. 8 illustrates an example of a nine binary bit CPE device identifier code embedded in the 0x0103 host-uniq tag.

The use of the same reference symbols in different drawings indicates similar or identical items.

DETAILED DESCRIPTION

Figure 1:
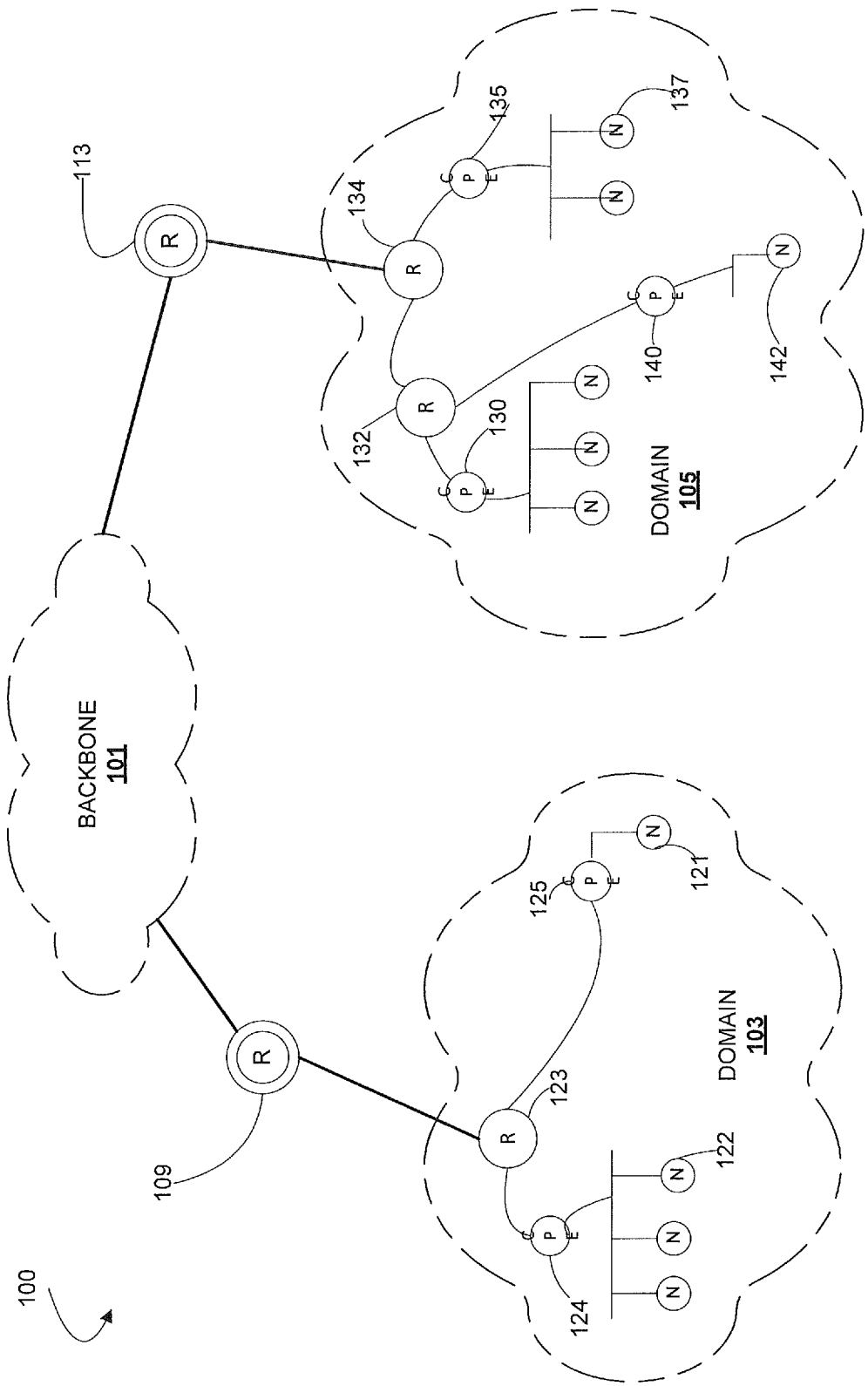
FIG. 1 is a simplified diagram of a distributed network.

In a particular embodiment, a method for identifying customer premises equipment (CPE) in a distributed network is presented. The method includes generating a device identifier code in response to receiving a point-to-point over Ethernet (PPPoE) packet communicated over the distributed network. A PPPoE active discovery initiation (PADI) packet is broadcast. The PADI packet includes a tag, such as a host-uniq tag, that specifically identifies a product model of a CPE device. A PPPoE active discovery offer (PADO) packet is received by the CPE. The CPE transmits a PPPoE active discovery request (PADR) packet in response to receiving the PADO packet. The PADR packet includes a tag that specifically identifies a product model of the CPE device. The CPE receives a PPPoE active discovery session (PADS) packet, and an Ethernet session is conducted.

In a particular embodiment, a method is presented for sending a point-to-point over Ethernet (PPPoE) active discovery packet. The PPPoE active discovery packet includes a tag that specifically identifies a product model of a customer premises equipment (CPE) device.

In a further embodiment, a disclosed method includes receiving a PPPoE active discovery packet. This packet is a PPPoE active discovery offer (PADO) packet in one embodiment, while the packet may be a PPPoE active discovery session (PADS) packet in another embodiment. The packet includes a tag that identifies a product model of a CPE device. The product model of the CPE device is determined based on the tag.

In a particular embodiment, a customer premises equipment (CPE) device is disclosed. The CPE device includes a network interface and a module coupled to the network interface. The module is configured to transmit a PPPoE active discovery packet including a tag. The tag includes a device identifier field that uniquely identifies a CPE product model.

In another embodiment, a system for identifying a communications device is presented. The system includes an access concentrator and a database server. The access concentrator is configured to receive an active discovery packet having a tag including a device identifier field. The active discovery packet is arranged for transmission by a communications device capable of terminating a point-to-point connection. The device identifier field uniquely identifies a product model associated with the communications device. The database server stores the device identifier field.

The present disclosure provides a method, system, and apparatus for use in identifying customer premises equipment (CPE) in a distributed network. The method utilizes a unique identifier that is provided by a CPE device to an access concentrator during the discovery stage of point-to-point over Ethernet (PPPoE) communications in a distributed network. An access concentrator collects this CPE-provided information, which may be used by a broadband service provider to identify, and thus manage, the CPE devices which form a part of the service provider's network domain. An example of a distributed network system including a collection of domains with one or more networks is illustrated in FIG. 1.

FIG. 1 is a simplified example of a distributed network, and is referred to as distributed network system 100. Distributed network system 100 can include numerous routing domains 103 and 105, which are connected to a backbone network 101. In a hierarchically arranged network system, backbone 101 is the central connection path shared by the nodes and networks connected to it. The backbone 101 administers the bulk of traffic between communicating nodes to provide end-to-end service between one user, for example, source node 121 in domain 103, and another user, for example destination node 142.

Each routing domain 103, 105 in distributed network system 100 is a collection of one or more local networks that are attached to the backbone 101 through one or more routers 123, 124, 125, 130, 132, 134, and 135. A router is a specialized computer for processing Internet protocol (IP) data and forwarding IP data along respective network paths. In the following discussion, the term local network shall be used to refer to all types of networks that may be included in a domain. Routing domains 103 and 105 are also referred to as autonomous systems (AS). An autonomous system is a set of nodes and routers that operate under the same administration. The domains 103 and 105 may be operated by the same service provider (same administration) or by different service providers. The networks in routing domains 103 and 105 may be residence/subscribers' home networks, local area networks (LAN), wide area networks (WAN), metropolitan area networks (MAN), or the like.

In a point-to-point (PPP) connectivity network, various types and models of CPE devices such as CPE devices 124 and 125, or 130, 140, and 135 are used to terminate the point-to-point connections. One type of point-to-point connectivity communications is point-to-point over Ethernet (PPPoE). With various types of broadband access, e.g. digital subscriber line (DSL) service, connectivity may be provided via PPPoE within the domains 103 and 105. It will be appreciated that the numbers of networks, routers, CPE devices, and nodes (nodes are depicted by a circle with 'N' inscribed within the circle) have been constrained in the example of FIG. 1 to avoid clutter.

Broadband access service, such as digital subscriber line (DSL) service, entails the use of a CPE device to terminate the DSL (PPPoE) connection at the residence or business location of the DSL subscriber. This is illustrated in FIG. 2, which illustrates a simplified diagram of a point-to-point connection being established.

Figure 2:
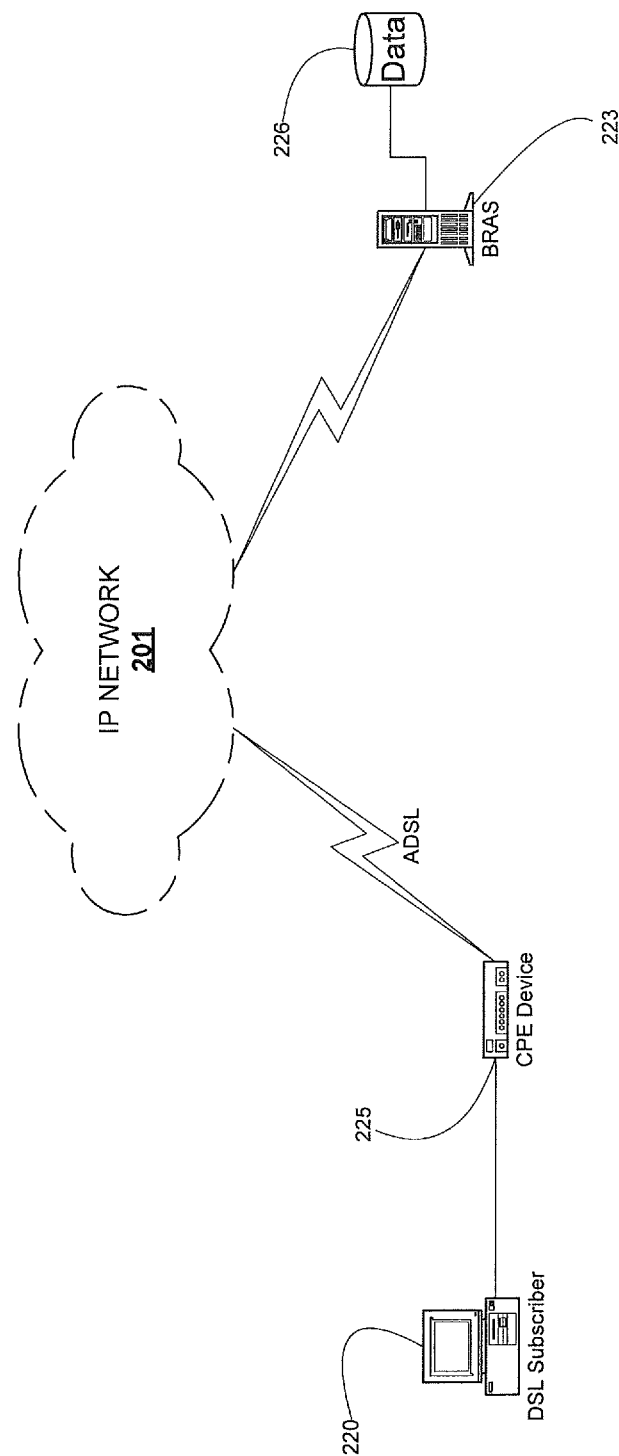
FIG. 2 is a simplified diagram of a customer premises equipment (CPE) device connected via an IP network to an access concentrator.

FIG. 2 illustrates a CPE device 225 connected through an IP network 201 to an access concentrator 223. In an embodiment, the access concentrator 223 is a broadband remote access server (BRAS).

Typically, the CPE device 225 terminates the asynchronous transfer mode (ATM) connection, and has point-to-point over Ethernet (PPPoE) software to complete a user authentication process. The CPE device 225 may be a router or a switch, or any device that terminates a PPPoE connection. The CPE device 225 contains a module configured to transmit a PPPoE packet including a tag to uniquely identify the CPE device 225 product model. Access concentrator 223 is connected to a database 226 to store the device identifier field data obtained from the CPE device 225 during discovery/authentication processes. The method utilizes the packet exchange during the conduct of a PPPoE discovery process.

Figure 3:
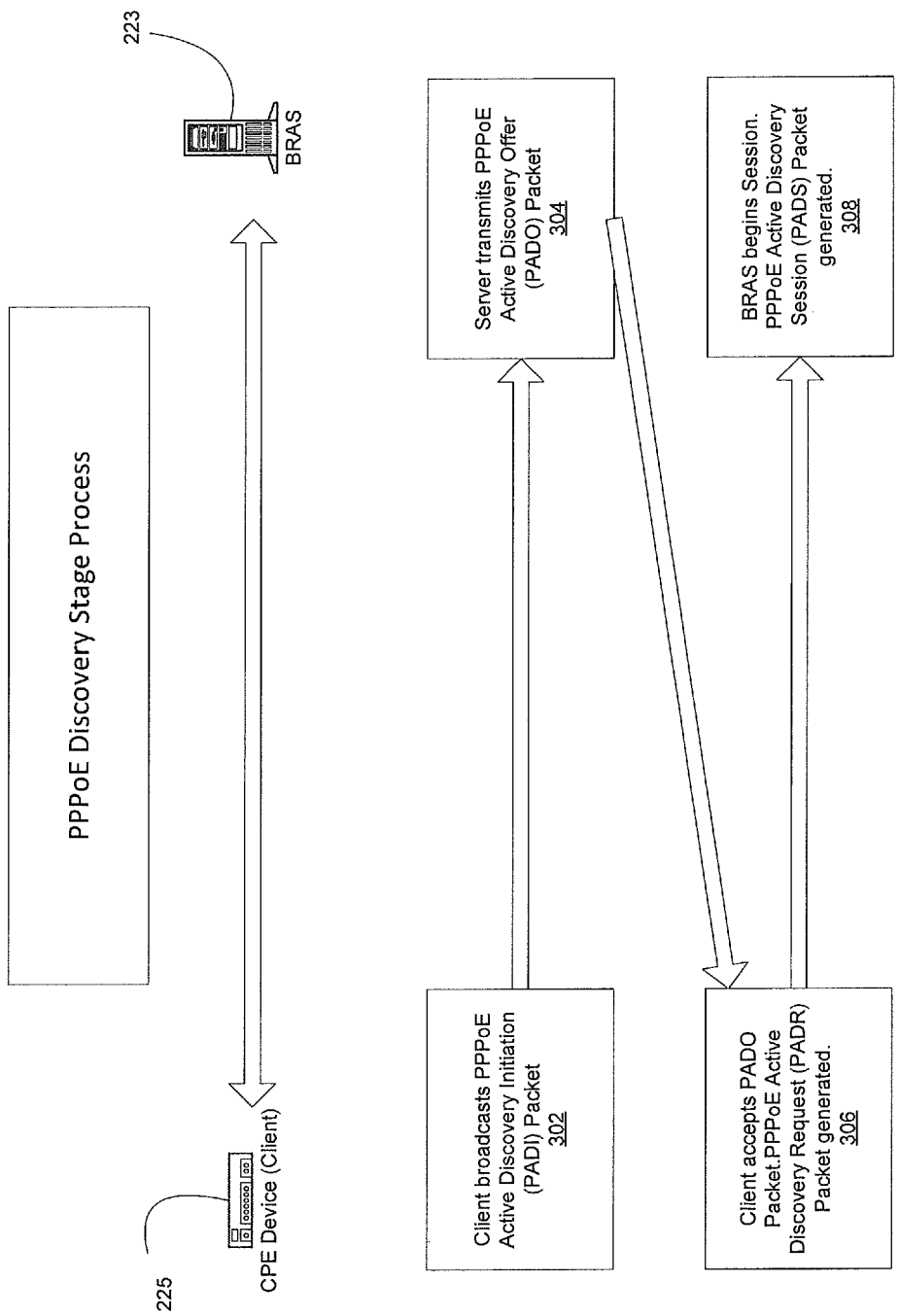
FIG. 3 is a flow diagram illustrating the stages of PPPoE discovery.

PPPoE has two distinct stages, a discovery stage, and a PPP session stage. When a host wishes to initiate a PPPoE session, it first performs discovery to identify the Ethernet media access control (MAC) address of the peer, and establishes a PPPoE SESSION_ID. Although PPP defines a peer-to-peer relationship, discovery is a client-server relationship. That is, in the discovery process, a host (the client, or CPE device 225) discovers an access concentrator 223 (the server), and various discovery steps are followed to permit the host and the server to have the information required to build their point-to-point connection over Ethernet. This discovery process is illustrated in FIG. 3.

The method and system disclosed herein utilizes a tag identified in Internet Engineering Task Force (IETF) RFC 2516 (A Method for Transmitting PPP over Ethernet (PPPoE)) in an innovative way to determine which CPE devices, such as CPE device 225, are connected to a network. The client (CPE 225) is capable of generating a device identifier code in response to receiving a PPPoE packet communicated over a distributed network. In the first step 302 of the discovery process, the CPE device 225 broadcasts a PPPoE active discovery initiation (PADI) packet. This PADI packet includes a tag that specifically identifies a product model of the CPE device 225. The tag in a particular embodiment is a host-uniq tag, and the device identifier code is a binary number associated with a specific product model or type of CPE device. In a specific embodiment, the binary number is a nine bit binary number.

The access concentrator 223, such as the broadband remote access server (BRAS), transmits a PPPoE active discovery offer (PADO) packet in step 304. In step 306, the PADO packet is received by the client 225, and accepted. In response to the PADO packet receipt, an active discovery request packet (PADR) packet is generated and transmitted to the server 223. The PADR packet can also include a tag that specifically identifies a product model of the CPE device 225. In step 308, the server receives the PADR packet, and generates and transmits a PPPoE active discovery session (PADS) confirmation packet. The session discovery process is concluded, and an Ethernet communication session is then conducted between the client 225 and the server 223.

The host-uniq tag information may be transmitted in the PADI packet. Alternatively, the host-uniq tag information may also be transmitted in the PADR packet. Generally it is most efficient to utilize the PADI packet for device identification, however, the CPE device could return the device identifier in the tag with a PADR packet as well. Whether the tag information is contained in the PADI or PADR packets, the access concentrator 223 receives the PAD packet, and stores the device identifier code in a database (226, FIG. 2). After collection of the device identifier codes in the tag, the database can be used to determine the specific product model of a CPE device based on the information embedded in the tag. This information is then available to be provided to customer service representatives to diagnose and repair user problems, thereby decreasing the number of customer site visits and subscriber call requests required of service technicians.

An advantage provided by the disclosed method is that it facilitates network management based upon the product model of the CPE devices determined to be present in the network. For example, the use of the host-uniq tag and the unique device identifier allows broadband service providers to check on the CPE devices in use on the provider's network. This information could be used to target marketing efforts, or to enable surveys of existing equipment to determine if the existing equipment will work with new technologies that a broadband service provider would like to deploy. It should be noted that although the examples provided thus far have discussed primarily DSL broadband services, PPPoE is an authentication system that is not restricted to DSL.

Figure 4:
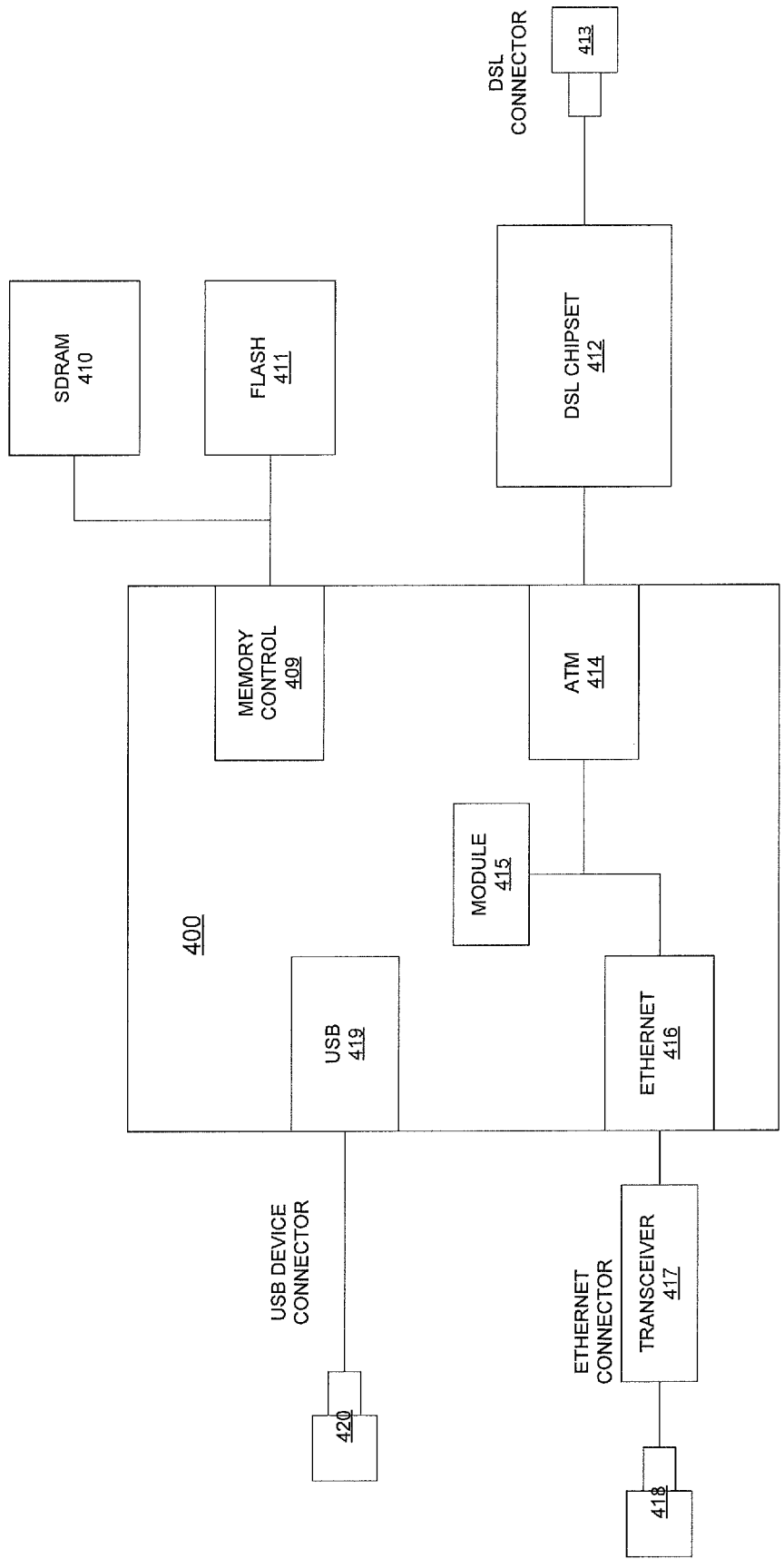
FIG. 4 is a block diagram of an ADSL bridge/router board which incorporates a module configured to transmit a point-to-point over Ethernet (PPPoE) active discovery packet, including a tag.

FIG. 4 is a block diagram of an ADSL bridge/router board 400 incorporating a module 415 configured to transmit a point-to-point over Ethernet (PPPoE) active discovery packet including a tag. In a particular embodiment, the tag comprises a device identifier field that uniquely identifies a CPE product model. It will be appreciated that, with the exception of module 415, the block diagram of FIG. 4 is provided as a generic example of an integrated microprocessor designed to meet the needs of communications applications, and as such does not represent the only architecture possible for CPE devices.

CPE board 400 includes a memory control module 409 with connecting Flash 411 and SDRAM 410 memory components. Other components in board 400 include a universal serial bus (USB) controller 419 and a USB device connector 420; an ATM segmentation and reassembly (SAR) controller module 414; a DSL chipset 412 and DSL connector 413; a 10/100 Mbps Ethernet controller module 416, transceiver 417, and connector 418. ATM controller module 414 and Ethernet controller module 415 have been integrated into the board 400 as network interfaces.

During a PPPoE discovery process, module 415 sends a PPPoE active discovery (PAD) packet. The PAD packet includes a tag comprising a device identifier field that uniquely identifies a CPE product model. The device identifier field can also be generated in response to receiving a PAD packet. The PAD packet containing the tag/device identifier can be a PADI packet, or alternately, a PADR packet. In one embodiment, the tag is a host-uniq tag, and the device identifier field comprises a predefined binary number embedded in the host-uniq tag. This predefined binary number can be a nine-bit binary device identifier code.

Figure 5:
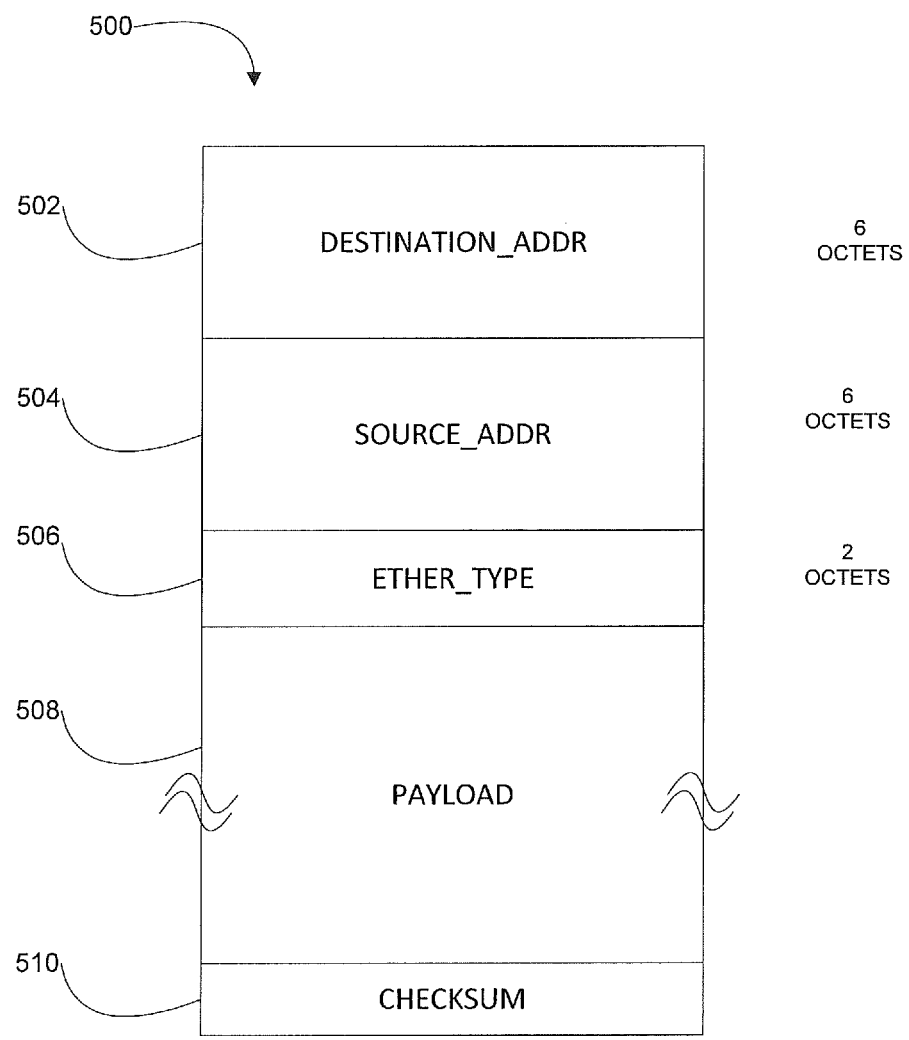
FIG. 5 illustrates a data packet for use in a distributed network.

FIG. 5 illustrates a data packet 500 for use in a distributed network. The data packet 500 includes a destination address field (DESTINATION_ADDR) 502 which typically contains either a unicast Ethernet destination address, or the Ethernet broadcast address (0xffffffff) For discovery packets, the field 502 value is either a unicast or a broadcast address. For PPP session traffic, the field 502 value contains the peer's unicast address as determined from the discovery stage.

A source address field (SOURCE_ADDR) 504 is also contained in data packet 500. This field 504 contains the Ethernet media access control (MAC) address of the source device. The ETHER_TYPE field 506 is set to a first value during the discovery stage, or to a second value during the PPP session stage. The payload field 508 contains the Ethernet payload for PPPoE, and is discussed in detail in FIG. 6. The checksum field 510 serves to verify packet integrity.

Figure 6:
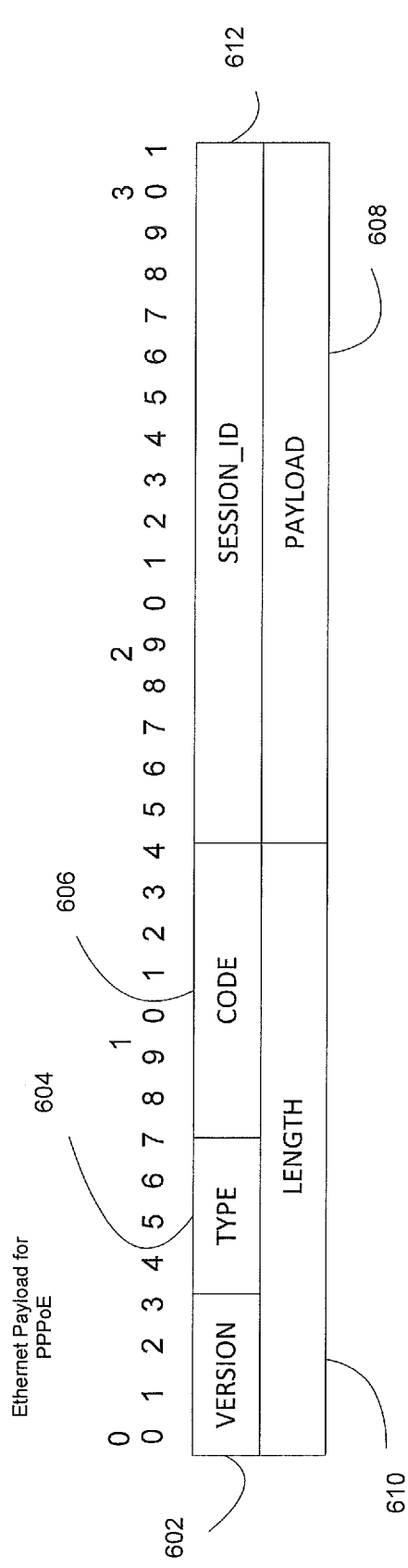
FIG. 6 illustrates an Ethernet payload for point-to-point over Ethernet (PPPoE)

FIG. 6 illustrates an illustrative Ethernet payload that may be used with PPPoE. The VERSION field 602 is four bits, and identifies the version number of the PPPoE specifications, e.g., 0x1. The TYPE field 604 is four bits, and identifies the Ethernet type for a given version of PPPoE specifications. The CODE field 606 is eight bits, and the CODE field value depends upon whether discovery stage or PPP stage is in effect.

The SESSION_ID field 612 is 16 bits, and is an unsigned value in network byte order. For a given PPP session, the field 612 is fixed, and defines a PPP session along with the Ethernet source address (504 in FIG. 5) and destination address (502 in FIG. 5). In the discovery stage, the SESSION_ID field 612 has a different value depending upon the type of discovery packet in which field 612 is contained. The LENGTH field 610 is 16 bits having a value, in network byte order, that indicates the length of the PPPoE payload 608.

Figure 7:
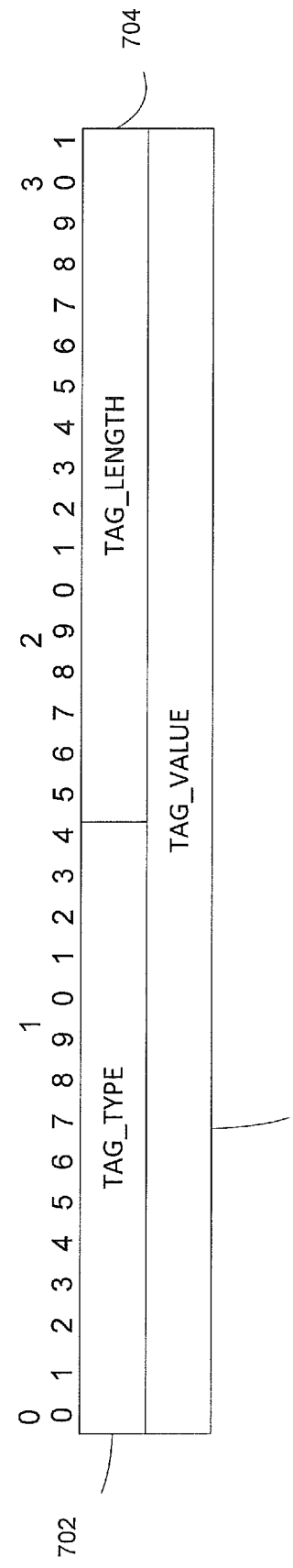
FIG. 7 illustrates a tag for use in an Ethernet payload.

A PPPoE payload 508 contains zero or more tags. A tag is a type-length-value (TLV) construct, and an example tag is shown in FIG. 7. The sample tag includes a TAG TYPE field 702 that is a 16 bit field in network byte order. A list of tag types that may be present in the field 702 includes tag types end-of-list, service-name, AC-name, host-uniq, and AC-cookie tags. The TAG_LENGTH field 704 is 16 bits, and is an unsigned number in network byte order which indicates the length in octets of the TAG_VALUE 706.

IETF RFC 2516 defines the host-uniq tag as follows: "This tag is used by a host to uniquely associate an access concentrator response (PADO or PADS) to a particular host request (PADI or PADR). The TAG_VALUE is binary data of any value and length that the host chooses. It is not interpreted by the access concentrator. The host may include a host-uniq tag in a PADI or PADR. If the access concentrator receives this tag, it must include the tag unmodified in the associated PADO or PADS response." From the foregoing IETF definition, it should be clear that although the present disclosure utilizes a predefined tag, the tag is utilized in a unique way to identify CPE devices, as well as to collect CPE device information at the access concentrator or database server attached to the access concentrator, for network management purposes.

An example of a nine bit binary CPE device identifier code embedded in a host-uniq tag is illustrated in FIG. 8. The CPE device identifier code uses numbers in the standard binary number system to produce any particular CPE device number between 0 and 512. In Example 1 of FIG. 8, an Efficient Networks 5861 Router has the binary number 000000001, making its device binary number equal to 1. In Example 2, a Netopia 3546 Router has the binary number 111111111, making its device binary number equal to 512. Using the examples of FIG. 8, when a device identifier code transmitted to the access concentrator/database from the CPE device is 111111111, the determination would be that this CPE device model type is a Netopia 3546 Router. Similarly, when the identifier code received is 000000001, the access concentrator would determine that the CPE device model type is an Efficient Networks 5861 Router.

The above disclosed subject matter is to be considered illustrative, and not restrictive, and the appended claims are intended to cover all such modifications, enhancements, and other embodiments which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
    a processor;
    an interface configured to receive a point-to-point over Ethernet active discovery packet and transmit a point-to-point over Ethernet active discovery session confirmation packet; and
    a memory adapted to store product model information for customer premises equipment device types, wherein each customer premises equipment device type of the customer premises equipment device types corresponds to a customer premises equipment device, wherein particular product model information is stored at the memory based on a tag that includes an identifier associated with a product model of a particular customer premises equipment device, wherein the tag is included in the point-to-point over Ethernet active discovery packet, the identifier distinct from a device identifier of the particular customer premises equipment device included in the point-to-point over Ethernet active discovery packet, wherein the processor is configured to identify whether the particular customer premises equipment device supports a service to be deployed based on the particular product model information.

2. The apparatus of claim 1, wherein the point-to-point over Ethernet active discovery packet is a point-to-point over Ethernet active discovery request packet.

3. The apparatus of claim 1, wherein the particular product model information comprises a device identifier code that identifies the particular product model information.

4. The apparatus of claim 1, further comprising an interface to provide the particular product model information to a customer service representative associated with a service provider.

5. The apparatus of claim 4, wherein the service provider is associated with an Ethernet communication session with the particular customer premises equipment device.

6. A method comprising:
    receiving, by a processing system including a processor and a memory, a point-to-point over Ethernet active discovery packet and transmitting, by the processing system, a point-to-point over Ethernet active discovery session confirmation packet; and
    storing, by the memory, product model information for customer premises equipment device types, wherein each customer premises equipment device type of the customer premises equipment device types corresponds to a customer premises equipment device, wherein particular product model information is stored by the memory based on a tag that includes an identifier associated with a product model of a particular customer premises equipment device, wherein the tag is included in the point-to-point over Ethernet active discovery packet, the identifier distinct from a device identifier of the particular customer premises equipment device included in the point-to-point over Ethernet active discovery packet; and
    identifying, by the processor, whether the particular customer premises equipment device supports a service to be deployed based on the particular product model information.

7. The method of claim 6, wherein the point-to-point over Ethernet active discovery packet is a point-to-point over Ethernet active discovery request packet.

8. The method of claim 6, wherein the particular product model information comprises a device identifier code that identifies the particular product model information.

9. The method of claim 6, further comprising, providing, by the processing system, the particular product model information to a customer service representative associated with a service provider.

10. The method of claim 9, wherein the service provider is associated with an Ethernet communication session with the particular customer premises equipment device.

11. A non-transitory machine-readable medium, comprising executable instructions that, when executed by a processing system including a processor, facilitate performance of operations, comprising:
    receiving a point-to-point over Ethernet active discovery packet and transmitting a point-to-point over Ethernet active discovery session confirmation packet; and
    storing, in a memory, product model information for customer premises equipment device types, wherein each customer premises equipment device type of the customer premises equipment device types corresponds to a customer premises equipment device, wherein particular product model information is stored by the memory based on a tag that includes an identifier associated with a product model of a particular customer premises equipment device, wherein the tag is included in the point-to-point over Ethernet active discovery packet, the identifier distinct from a device identifier of the particular customer premises equipment device included in the point-to-point over Ethernet active discovery packet; and
    identifying whether the particular customer premises equipment device supports a service to be deployed based on the particular product model information.

12. The non-transitory machine-readable medium of claim 11, wherein the point-to-point over Ethernet active discovery packet is a point-to-point over Ethernet active discovery request packet.

13. The non-transitory machine-readable medium of claim 11, wherein the particular product model information comprises a device identifier code that identifies the particular product model information.

14. The non-transitory machine-readable medium of claim 11, wherein the operations further comprise providing the particular product model information to a customer service representative associated with a service provider.

15. The non-transitory machine-readable medium of claim 14, wherein the service provider is associated with an Ethernet communication session with the particular customer premises equipment device.

* * * * *